(12) United States Patent
Marie

(10) Patent No.: US 7,766,215 B2
(45) Date of Patent: Aug. 3, 2010

(54) FRICTION STIR WELDING PROCESS

(75) Inventor: Francois Marie, Rueil Malmaison (FR)

(73) Assignee: European Aeronautic Defence and Space EADS France, Paris (FR)

( * ) Notice: Subject to any disclaimer, the term of this patent is extended or adjusted under 35 U.S.C. 154(b) by 34 days.

(21) Appl. No.: 12/226,407

(22) PCT Filed: Apr. 3, 2007

(86) PCT No.: PCT/FR2007/051059
§ 371 (c)(1),
(2), (4) Date: Oct. 17, 2008

(87) PCT Pub. No.: WO2007/122338
PCT Pub. Date: Nov. 1, 2007

(65) Prior Publication Data
US 2009/0188968 A1    Jul. 30, 2009

(30) Foreign Application Priority Data
Apr. 20, 2006    (FR) .................... 06 51383

(51) Int. Cl.
B23K 20/12    (2006.01)
(52) U.S. Cl. .................... 228/112.1; 228/2.1
(58) Field of Classification Search .......... None
See application file for complete search history.

(56) References Cited

U.S. PATENT DOCUMENTS

| 5,893,507 | A  |   | 4/1999 | Ding et al. |         |
|-----------|----|---|--------|-------------|---------|
| 6,045,028 | A  | * | 4/2000 | Martin et al. | 228/112.1 |
| 6,273,323 | B1 | * | 8/2001 | Ezumi et al.  | 228/112.1 |
| 6,484,924 | B1 | * | 11/2002| Forrest       | 228/112.1 |
| 6,499,649 | B2 | * | 12/2002| Sayama et al. | 228/112.1 |
| 7,163,136 | B2 | * | 1/2007 | Hempstead et al. | 228/2.1 |
| 7,480,992 | B2 | * | 1/2009 | Okamoto et al. | 29/890.054 |
| 2001/0019073 | A1 | * | 9/2001 | Ezumi et al. | 228/112.1 |

(Continued)

FOREIGN PATENT DOCUMENTS

JP    10 071478    3/1998

(Continued)

OTHER PUBLICATIONS

Machine translation of Hashimoto JP-10-193140.*

(Continued)

*Primary Examiner*—Kiley Stoner
(74) *Attorney, Agent, or Firm*—Young & Thompson

(57) ABSTRACT

The invention relates to a process for the friction stir welding of two panels (20, 21), using a welding device (25) having a retractable pin (29), comprising the following steps: positioning the two panels (20, 21) so as to be in contact over an overlap region (24) and keeping them in the desired relative position after welding; bringing the welding device into contact with the upper panel at the start of the welded joint; longitudinally welding the two panels, by moving the welding device as far as the end of the welded joint; continuing to move the welding device (25) along a path extending beyond the end of the welded joint; and retracting the retractable pin (29) so as to prevent the appearance of a weld hole in a portion of the path of the welding device (25) extending beyond the end of the welded joint.

19 Claims, 2 Drawing Sheets

U.S. PATENT DOCUMENTS

Figure 1:
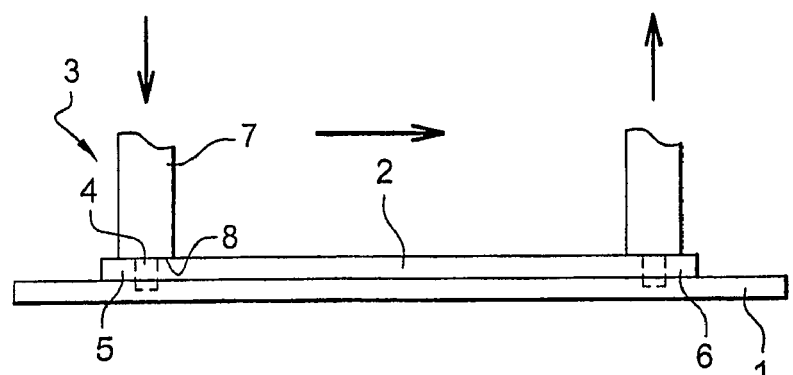

| | | | |
|---|---|---|---|
| 2002/0125298 A1* | 9/2002 | Ezumi et al. | 228/112.1 |
| 2004/0197532 A1* | 10/2004 | Barnes | 428/195.1 |
| 2005/0133567 A1* | 6/2005 | Runyan | 228/112.1 |
| 2005/0139640 A1* | 6/2005 | Kay | 228/112.1 |
| 2006/0027630 A1* | 2/2006 | Talwar et al. | 228/112.1 |
| 2006/0191978 A1* | 8/2006 | Barnes | 228/112.1 |
| 2006/0255098 A1* | 11/2006 | Runyan | 228/112.1 |
| 2007/0000972 A1* | 1/2007 | Koga et al. | 228/112.1 |
| 2007/0044406 A1* | 3/2007 | Van Aken et al. | 52/459 |
| 2007/0119906 A1* | 5/2007 | Mika | 228/112.1 |
| 2007/0187466 A1* | 8/2007 | Sayama et al. | 228/101 |
| 2007/0199978 A1* | 8/2007 | Ezumi | 228/112.1 |
| 2008/0011810 A1* | 1/2008 | Burford | 228/2.1 |
| 2008/0235946 A1* | 10/2008 | Ide et al. | 29/888.09 |
| 2008/0251571 A1* | 10/2008 | Burford | 228/114.5 |
| 2009/0072007 A1* | 3/2009 | Nagano | 228/112.1 |

FOREIGN PATENT DOCUMENTS

| | | |
|---|---|---|
| JP | 10 193140 | 7/1998 |
| JP | 11 197856 | 7/1999 |
| JP | 2007-61877 A * | 3/2007 |

OTHER PUBLICATIONS

International Search Report dated Sep. 11, 2007, in PCT application.

* cited by examiner

FRICTION STIR WELDING PROCESS

The invention relates to a friction stir welding process. More specifically, the invention relates to such a welding process that makes it possible to weld two plates that are placed side by side against one another over all or part of their contact surface. The invention finds applications in particular in the aeronautical industry for welding sheet metal, backing bars, etc.

Welding by friction is a mechanical welding process where the heat that is necessary for welding is provided by rubbing or by rotating the parts to be assembled against one another under an axial pressure.

So as to be able to weld one relatively bulky part, which cannot be easily rotated, to another, it is known to use friction stir welding. The friction stir welding uses a rotary device that comprises a shaped pin and a shoulder. The pin is pushed into the material of the parts to be welded until the shoulder touches the surface of the material to be welded. The material is heated by friction at temperatures where it is easily deformable. When the welding device goes forward, the material flows from the front to the back of the path of the pin to form a welded joint. Front and back are defined relative to the direction of advance of the welding device during said welding operation. Welded joint is defined as the material of the surfaces to be welded, moved when it is in the pasty state by the advance of the pin from the welding device.

The friction stir welding process has, due to its nature, numerous advantages. In particular, the process does not require the contribution of any additional material, such as gas or metal. Furthermore, to the extent that said process operates in the pasty phase, there is no fusion of the material of the parts to be welded. Also, deformations are slight, and risks of blisters, cracking when hot, inclusion, etc., are greatly reduced. In addition, to the extent that the temperatures that are reached remain less than the melting point of the materials to be welded, the mechanical characteristics of the final assembly are elevated and in most cases superior to those obtained with traditional welding processes.

However, the finishing of the welded joint that is produced by using the friction stir welding process as is currently known cannot be satisfactory.

Actually, as is shown in FIG. 1 of the prior art, the welded joint cannot travel through the cover zone of the plates to be welded, respectively lower plate 1 and upper plate 2, from one edge to the next, because the material in the pasty state could flow to the edge of the upper plate 2 if the welded joint was initiated or terminated on or below or above an edge of said upper plate. Plate is defined as any part that is equipped with an extended surface and with small thickness relative to the other dimensions of the plate.

The upper plate 2 therefore at least partially covers the lower plate 1 such that at least one portion of a surface of the lower plate 1 is covered close to each end of the welded joint by a portion of a surface of the upper plate 2 without a welded joint.

A device 3 for friction stir welding is used for welding the two plates 1, 2. The welding device 3 is equipped with a pin 4 that projects on a shoulder 8 of the body 7 of said welding device 3. The pin 4 is a stationary projection relative to the body 7 of the welding device 3. The welding device 3 is brought into rapid rotation and rubs on the two plates 1 and 2 that are positioned and maintained in the assembly position that is desired by equipment, not shown. The friction of the welding device 3 on the plates 1, 2 is transformed into heat and causes a softening of the material of plates 1, 2, which then locally enters into a pasty state. The pin 4 has a suitable length to penetrate the joint plane at the interface between the upper plates 2 and the lower plate 1 to be welded. During its rotary motion and its translation, the pin 4 closely mixes the materials of the two plates 1, 2 by a combined operation of drilling and extrusion of said materials. The assembly is carried out step by step.

Because of the risk that the softened material will flow from the front to the back of the pin 4, it is not possible to initiate the friction stir welding at the rear end 5 of the upper plate 2 or to terminate said welding exactly at the front end 6.

Furthermore, at the end of welding, it is necessary to withdraw the welding device 3. Thus, during the withdrawal, the pin 4, at the front end of the welded joint that is produced, leaves an imprint or a weld hole, in the welded plates 1, 2. The presence of this weld hole weakens the connection between the two plates 1 and 2. In addition, risks of corrosion and cracking at the location of the weld hole are increased.

To eliminate the weld hole at the end of the welded joint, the welded plates are produced in general with dimensions that are greater than the desired dimensions, then said plates are cut after their assembly by having taken care to terminate the welding in one of the zones that will be eliminated with the weld hole.

In the case of an edge-to-edge weld, and when the welded joint follows a path that withdraws into itself, it is not possible to eliminate the weld hole by eliminating the zone of the plates where the weld hole is formed. In this case, it is known to use a device 10 for friction stir welding, of which one detail is shown in FIG. 2 of the prior art, which is equipped with a retractable pin 12.

The welding device 10 comprises at least two parts. A first part 11 forms the shoulder that is designed to generate by friction the heat that is necessary for welding. The second part consists of the retractable pin 12 that is mounted to move along the axis of rotation of the welding device 10 inside the shoulder 11. The retractable pin 12 can thus, upon command, be pushed more or less far into the joint plane, i.e., penetrate more or less of the thickness of the adjacent plates edge to edge. When the path of the welding tool 10 returns to its starting point after having traveled a path that withdraws into itself, the user of the device 10 for friction stir welding causes the gradual retraction of the retractable pin 12, so that the retractable pin 12 is entirely retracted before the shoulder 11 is no longer in contact with the plate surface.

It is possible, of course, to use a welding device 10 that is provided with a retractable pin 12 to produce a welded joint along an open line, but in this case, the welded joint that is produced is of poorer quality at the welded end at which the pin was retracted, whereby the characteristics of the welded joint are degraded since the pin penetrates the thickness of the plates to a lesser extent.

Figure 2:
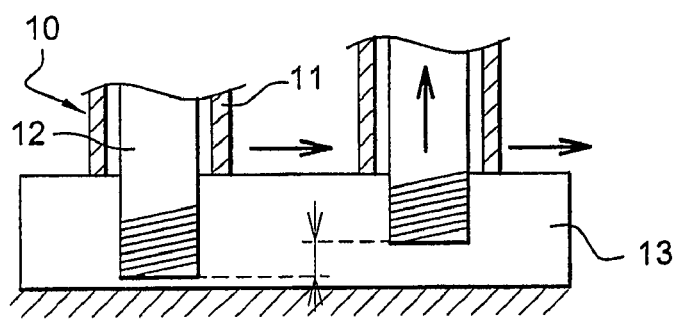

Actually, and as can be seen in FIG. 2, as the pin 12 is retracted, the plunge depth of the retractable pin 12 into the thickness of the plate 13 decreases and then becomes zero, such that the amount of material of the plate 13 that is stirred and mixed with the material of the adjacent plate edge to edge decreases. The solidity of the welded joint that is produced therefore also decreases. The related end of the welded joint, and plates, is weakened, and the problem encountered with the welding process that implements a welding device 3 comprising a stationary pin 4 is not resolved. When the parts to be welded have their final dimensions before the welding operation and they cannot be cut again at the welded joint that is produced, a weakening of the welded parts that are obtained occurs.

In the invention, an effort is made to improve the friction stir welding process of the prior art. In particular, an effort is made to provide a friction stir welding process of two plates making it possible to eliminate the weld hole at the end of the welded joint, while ensuring a good quality of the welded joint over its entire length. Length of the welded joint is defined as the dimension of said joint that extends from the so-called rear end from the beginning up to the so-called front end of the end of the welded joint. Front end or welded joint end is defined as the portion of the welded joint that is produced at the end of the welding process.

For this purpose, in the invention, a friction stir welding device that is equipped with a retractable pin whose path is extended beyond the front end of the welded joint and whose retractable pin is retracted on a portion of the path that may or may not begin in the zone of the welded joint and extends beyond the front end of the welded joint is used. The process can be combined with the preliminary creation, on an upper plate, a plate whose free face is traversed by the welding device, of a gradually thinned edge of its front end, which is where the welded joint should end. Gradual thinning means that the front end has variations of thickness so as to gradually reduce the thickness of the plate from the initial thickness to a zero thickness. For example, the front end of the upper plate is equipped with an edge that forms a bevel. The front end can otherwise be equipped with a succession of steps that may or may not be connected by edges. As the welding device advances by friction stir on the upper plate at the thinned front end, the retractable pin is retracted while maintaining, for example, an essentially constant plunge depth in the lower plate. Thus, by managing the projection and the retraction of the retractable pin of the welding device, an essentially constant penetration depth is obtained in the thickness of the lower plate. The thickness of material of the lower plate that participates in the formation of the welded joint is then the same over the entire length of the welded joint. The mechanical characteristics of the welded joint are therefore homogeneous, and the welded plates are not degraded.

To produce a welded joint over the entire desired length without a weld hole continuing at the end of welding, the invention therefore has as its object a process for the friction-stir production of a welded joint of two plates, respectively upper plate and lower plate, whereby said welded joint is produced between a first so-called beginning end and a second so-called separate final end of the first end, using a welding device with a retractable pin, whereby said process comprises the following steps:

Positioning and keeping the two plates in contact along a cover zone in the desired relative position after welding, Bringing the welding device into contact with one or more plates in a zone close to the beginning of the welded joint, Longitudinally welding the two plates by moving the welding device to the final end of the welded joint, Continuing the movement of the welding device along a path that extends beyond the final end of the welded joint, Retracting the retractable pin so as to prevent the appearance of a weld hole in a portion of the path of the welding device that extends beyond the final end of the welded joint.

To improve the characteristics of the welded joint on the edges of the upper plate, the upper plate advantageously comprises a front edge, located on the edge of said plate on the side of the final end of the gradually thinned welded joint.

In this case, the retractable pin is retracted based on the position of the welding device on the thinned front edge to preserve a desired penetration depth in the lower plate.

In particular, it is retracted to maintain an essentially constant stirring depth in the thickness of the lower plate between the beginning end and the final end of the welded joint.

In a particular embodiment of the process, the front edge is thinned by means of a bevel, which bevel has a length that is preferably between 5 and 15 times the thickness of the upper plate so as to limit the risk that the material that is brought to the pasty state by the welding operation might flow.

To ensure the correct input of energy by friction, the shaft of the welding device is oriented to be kept approximately perpendicular to the surface for contact with the assembly of plates at all points of the path of said welding device, in particular on the thinned edge.

In particular, the portion of path that is followed by the welding device that extends beyond the final end of the welded joint is produced in a front exposed zone of the plate, and said portion of the path is oriented approximately in the extension of the welded joint or, in contrast, in a direction essentially different from the direction of the welded joint, for example in a direction that is essentially parallel to the edge of the lower plate that is located on the side of the front exposed zone.

Alternately, the direction of movement of the welding device is modified such that the portion of the path that is taken by the welding device that extends beyond the final end of the welded joint is located in the region of the cover zone of the two plates to be welded.

In this case, the retractable pin is advantageously retracted from its position at the end of the welded joint, during the portion of the path that is taken by the welding device after the end of the welded joint. The retractable pin can also be brought out toward the outside to ensure the stirring of the materials of the plates, for example over a portion of the welded joint already produced, over at least a part of the portion of the path that is taken by the welding device from the final end of the welded joint before retracting the retractable pin to prevent the formation of a weld hole.

To improve the quality of the welded joint at its end by which the joint is begun, and in particular to reduce as much as possible the unwelded length whose weld characteristics would not be optimum, the process also comprises a step during which the path of the welding device between the beginning end of the welded joint and the final end of the welded joint is preceded by a portion of the path that originates at a contact point of said welding device with one or more plates during assembly and that ends at the beginning end of the welded joint.

Said contact point of the welding device is selected, for example, in the region of the cover zone of the two plates or else, in contrast, in a front exposed zone of the lower plate.

Advantageously, the upper plate comprises a rear edge, located on the edge of said plate on the side of the beginning end of the welded joint, gradually thinned, for example by means of a bevel whose length is advantageously between 5 and 15 times the thickness of the upper plate.

In these cases, the retractable pin is brought out based on the position of the welding device on the thinned rear edge to preserve a desired penetration depth into the lower plate.

In addition, the shaft of the welding device is oriented to be kept approximately perpendicular to the surface for contact with the assembly of the plates at any point of the path of said welding device on the portion of the path between the contact point of said welding device with one or more plates, and the zone of the path or the thickness of the upper plate is essentially constant.

The welding process according to the invention is advantageously implemented for the welding of an elongated plate, for example whose ratio between the length and the width is at least equal to 10, such as a structural backing bar, on a large-dimension plate whose width is on the same order of magnitude as the length, such as, for example, a plate for covering a structure such as an aircraft fuselage.

Figure 3A:
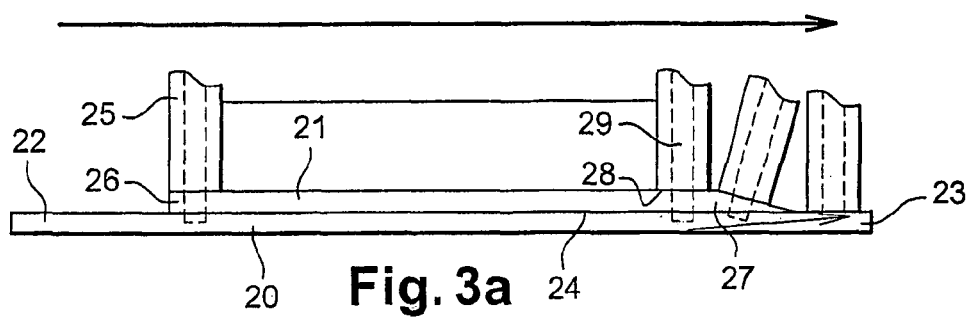
Figure 3B:
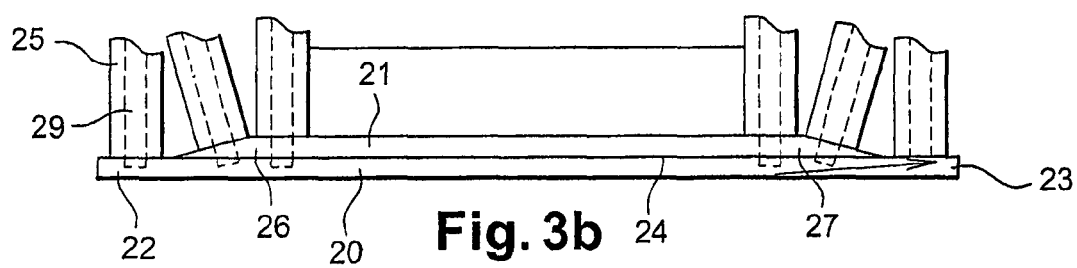
Figure 4A:
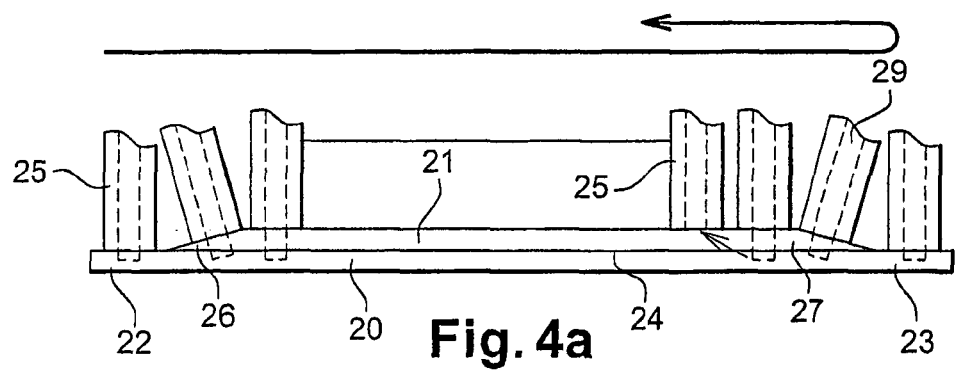
Figure 4B:
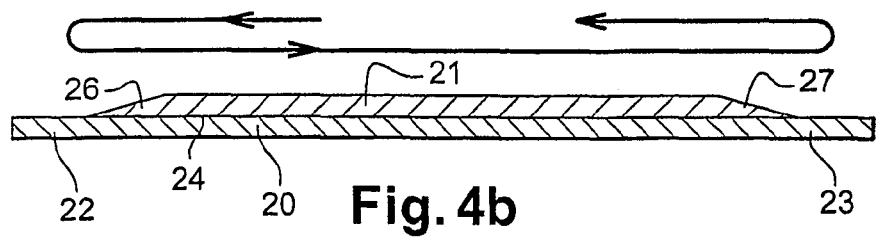

The invention will be better understood from reading the following description and from the examination of the figures that accompany it. The latter are presented by way of indication and in no way limit the invention. The figures show:

FIG. 1: A diagrammatic representation of a friction stir welding device with a stationary pin of the prior art, already described above;

FIG. 2: A diagrammatic representation of a friction stir welding device with a retractable pin of the prior art, already described above;

FIGS. 3a and 3b: Two diagrammatic representations of a friction stir welding device for welding two plates according to the invention, in which the final retraction of the retractable pin is located at one welded end;

FIGS. 4a and 4b: Two diagrammatic representations of a friction stir welding device for welding two plates according to the invention, in which the final retraction of the retractable pin is located at the cover zone of the plates.

Figure 5:
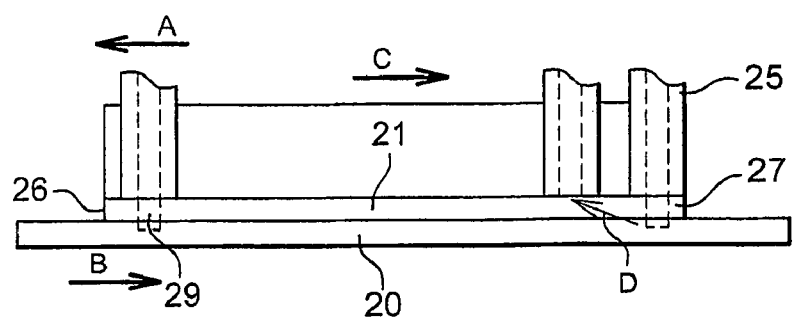

FIG. 5: Another diagrammatic representation of a friction stir welding device for welding two plates according to the invention, in which the final retraction of the retractable pin is located at the cover zone of the plates.

FIG. 3a shows a lower plate 20 that is at least partially covered by an upper plate 21. Upper plate is defined as the plate that is subjected directly to the action of a friction stir welding device on one of its faces, said upper face. Lower plate is defined as the plate that is located under the lower face of the upper plate, opposite to the face of the upper plate that is subjected directly to the action of the welding device.

The lower plate 20 corresponds to, for example, the plate that constitutes the outside covering of a structure such as an aircraft fuselage and the upper plate 21 to the cap of a backing bar that should be attached to said covering. Whereby the lower plate 20 has dimensions that are strictly larger than the dimensions of the upper plate 21, the lower plate 20 comprises a rear exposed zone 22, located upstream from the cover zone 24, and a front exposed zone 23, located downstream from the cover zone 24. Cover zone is defined as the zone in which the upper plate 21 covers the lower plate 20. Upstream and downstream are defined respectively as to the rear and to the front of the welding device 25, relative to the position and to the direction of advance of said welding device 25, during the production of the welded joint from a rear edge 26 to a front edge 27 of the upper plate 21.

A friction stir welding process according to the invention consists in imparting to the welding device 25 that comprises a retractable pin 29 a path for contact with the plates to be welded that, at least on the side of the downstream end of the welded joint, is stopped at a point that does not strictly correspond to the end of the welded joint.

In a first embodiment of the process, the welding device carries out the welding according to the conventional process up to the front edge 27 of the upper plate 21, whereby the pin 29 is in the out position, then starting from this point, contrary to the conventional process in which the welding device is withdrawn by leaving a weld hole, the path of the welding device is reversed to return in the direction of the rear edge 26 at the same time that the pin 29 is retracted into the welding device 25.

By this process, the welding can be carried out as close to the edge 27 as possible with the required depth to obtain the desired qualities of the welded joint, and the pin can be retracted without any weld hole existing.

The distance over which the path of the welding tool 25 is reversed should be sufficient to allow the pin 29 to retract under good conditions, in practice 0.5 to 5 times the diameter of the shoulder of the welding tool 25. The minimum value of this distance depends on the thicknesses of the materials that are considered and the type of materials that constitute the plates, and it is advantageous to verify this case by case in an experimental manner.

Although the penetration of the welding tool at the beginning of the welded joint is less critical since the problem of the weld hole is not posed, an analogous process advantageously can be used upon startup of the welding operation. Thus, the welding tool is brought into contact with the upper plate 21 at a point that is located downstream from the end 26 of said plate and begins by following a path in the direction of this front end 26 before moving toward the end 27 of the plate 21 for producing the welded joint over its entire length. By following this process at the beginning of the path of the welding tool 25, it is possible to bring the tool close to the edge 26 of the upper plate 21 and to obtain a welded joint of homogeneous quality from its starting end.

During phases during which the path of the welding tool 25 is reversed, the welding tool can advantageously follow a path that is superposed on the one that corresponds to the welded joint.

In another embodiment, the welding device 25 makes it possible to weld the upper plate 21 on the lower plate 20 from the rear end 26 up to the front end 27 of the upper plate 21.

According to this process, the front end 27 of the upper plate 21 is prepared to form an edge that gradually thins, for example an edge that has a bevel as illustrated in FIG. 3a. In this case, by reaching the front beveled edge 27, the welding device 25 is inclined such that the axis of rotation of said welding device is kept approximately perpendicular to the free surface of the assembled plates 20 and 21 so as to follow the slope of said front beveled edge 27 or the variations of thickness of the upper plate 21 and to keep the shoulder 28 of said welding tool 25 in contact with the surface of the upper plate 21. The desired slope of the shaft of the welding device is produced without particular difficulty by mounting the welding device on a spindle that can be oriented and that is commonly used in the field of numerical-control machining in particular. In contrast to conventional welding processes, in the present process the path that is given to the welding tool is not limited to the zone in which the two plates 20 and 21 are covered but continues on the free surface of the largest plate 20. As the welding device 25 advances on the edge 27 with variable thickness of the upper plate 21, the movement of the welding device 25 is accompanied by a gradual retraction of the retractable pin 29 such that the retractable pin 29 continues to penetrate the lower plate to ensure a correct stirring of the materials of the two plates 20 and 21. In a last phase when the welding joint is finished up to the boundary of the downstream part of the cover zone 24, the pin is gradually totally retracted during a movement of the welding device.

When the upper plate (21) is thinned by means of a bevel, the angle of the bevel is to be selected with a value that is low enough so that the material, in the pasty state during the welding operation, does not flow because of the slope. The fluidity of the material in this phase is therefore an essential parameter that depends on the characteristics of said material that is being considered. In general, the length of the bevel will be between 5 and 15 times the thickness of the upper plate 21. A longer length can be used, but it is generally desirable to limit it to use as well as possible the space that is actually available.

In the example that is shown in FIG. 3a, the retractable pin 29 is completely retracted when the welding device 25 is located in the front exposed zone 23 of the lower plate 20. The retractable pin 29 therefore continues to be pushed into the material of the lower plate 20, beyond the cover zone 24, such that the stirred zone ends in the front exposed zone 23. In another embodiment, it is possible to provide kinematics of retraction of the retractable pin 29, such that the retractable pin 29 is completely retracted when the welding device 25 reaches the end of the front beveled flange 27. Thus, the welded joint ends at the junction between the cover zone 24 and the front exposed zone 23 of the lower plate 20. This last embodiment applies in particular when the lower plate 20 in the exposed zone 23 does not use adequate space to end the welded joint on said lower plate.

Preferably, the gradual retraction of the retractable pin 29 is carried out so as to keep the plunge depth of the retractable pin 29 into the lower plate 20 essentially constant and essentially equal to that sought during the production of the welded joint over the entire length of the welded joint that is located in the cover surface 24 between the upper plate 21 and the lower plate 20. Thus, a constant quality of the welded joint over the entire length of said welded joint and the integrity of the characteristics of plates 20, 21 are ensured.

In the example that is shown in FIG. 3b, the upper plate 21 is equipped with a rear flange 26 that also becomes thinner gradually, such as a beveled flange. It is then possible to begin the stirring at the rear exposed zone 22 of the lower plate 20. The retractable pin 29 of the welding device 25 first penetrates only the lower plate 20, at the rear exposed zone 22. Then, the welding device 25 follows the variations of thickness of the upper plate 21, such as those of the rear beveled edge 26 of said upper plate by adhering to a slope of said device 25 to keep the shaft of the welding device 25 approximately perpendicular to the free surface of the assembled parts 20 and 21. In a first step, the retractable pin 29 is placed in a position such that it goes beyond the welding tool by the length corresponding to the desired penetration depth in the lower plate 20, then, as the welding device 25 climbs the slope of the rear beveled edge 26, the retractable pin 29 is brought out beyond the shoulder of the welding device 25 in the direction of the plates 20, 21 so as to pass through the upper plate 21 and to continue to penetrate the lower plate 20.

Advantageously, the retractable pin 29 is brought out in the direction of the plates 20, 21 based on the rate of advance of the welding device 25 and variations of thickness of the upper plate 21, so as to preserve a constant plunge depth of the retractable pin 29 into the thickness of the lower plate 20. This constant plunge depth into the plate 20 is advantageously the one that is selected for the production of the welded joint over the entire length of said welded joint.

It is also possible to begin the welded joint exactly at the rear end of the cover zone 24, i.e., at the rear end of the rear beveled edge 26 of the upper plate 21, in particular if the dimensions of the lower plate 20 limit the possibility of beginning the stirring more upstream.

Following the welding process of the invention, it is therefore possible to produce a welded joint that ranges from the rear end up to the front end of an upper plate 21 by means of said upper plate 21 whose two flanges, rear 26 and front 27, are beveled. This ensures a good connection between the two plates 20, 21 over the entire covering length of said plates 20, 21.

FIG. 4a shows another embodiment of the friction stir welding process according to the invention. According to this particular embodiment, the path of the welding device ends at the cover zone 24 after having produced the welded joint by passing through the front exposed zone 23 of the lower plate 20, whose front edge 27 has a gradual thinning like, for example, a bevel.

For this purpose, in a first step, the welding device 25 is moved by following the same steps as in the preceding embodiment of the process, from upstream from the welded joint to the front exposed zone 23 of the lower plate 20, by passing through the thinned front edge 27 of the upper plate 21. However, contrary to the preceding embodiment, the retractable pin 29 is not retracted, whereas the welding device 25 is in the front exposed zone 23, but the movement of the welding device 25 is reversed to bring said welding device toward the cover zone 24.

During this movement in a reversed direction, the welding device preferably follows the path that is followed during the production of the welded joint to increase the stirring of the material in the welded joint.

Advantageously, during the movement of the welding device 25 in a reversed direction, the control of said device 25 is passed from a force setting on the shoulder to a position setting on said shoulder. Actually, because the welding device 25 goes back along the path followed during the production of the welded joint, there is a risk of the shoulder of the welding device 25 being pushed into the already stirred material. Also, so as to eliminate the need for modifications of the characteristics of the materials, the shoulder is controlled more in terms of position than in terms of force. A certain penetration depth of the shoulder in the material is thus imposed by preventing an excessive plunging of said shoulder into the material.

The retractable pin 29 is retracted a first time, when the welding device 25 goes down the slope of the front thinned edge 27 of the upper plate 21 while maintaining an adequate length so that said pin adequately penetrates the thickness of the lower plate 20. When the path that is followed by the welding device is reversed and when said device climbs the slope that is formed by the front thinned edge 27, the retractable pin can be gradually completely retracted to prevent the formation of the weld hole.

Alternately, the retractable pin 29 is again brought out beyond the shoulder of the welding device 25 in the direction of the plates 20, 21 as it climbs the slope that is formed by the front thinned edge 27 such that the pin continues to exert stirring over a significant depth without, however, penetrating the lower plate 20 that is essentially beyond the depth stirred for the production of the welded joint. The final retraction of the retractable pin 29 is then carried out at the cover zone 24. The welding operation is therefore terminated in the cover zone 24.

Advantageously, this embodiment of the friction stir welding process is combined, at the beginning of the welded joint, with one of the described embodiments that consists in either traversing—with the welding device—a path on the upper face of the plate 21 and comprising a first movement in the direction of the rear edge 26 before carrying out the movement toward the front edge 27, or using an upper plate 21 with a thinned rear edge 26 and beginning the stirring in the rear exposed zone 22. In this way, the front end of the upper plate 21 is perfectly welded onto the lower plate 20.

As is shown diagrammatically in FIG. 4b, it is also possible to begin the production of a welded joint by combining the two movements of the welding device already presented with a thinned upper plate (20) at the level of its two front and rear edges 26, 27.

For this purpose, the welded joint is begun in the cover zone 24. The welding device 25 is directed from this initial anchoring point to the rear exposed zone 22 of the lower plate 20 and follows the variations of thickness and slope of the upper covering 21. The position of the retractable pin 12 is, as already described above, modified during the movement to ensure the correct stirring of the material of plates 20 and 21. Starting from the rear exposed zone 22, the path of the welding device 25 is reversed. The welding device 25 again follows—but in the direction of the climb—the variations of thickness of the rear edge 26 of the plate 21 while adhering to a slope that keeps the shaft of the welding device 25 approximately perpendicular to the surface in contact with the shoulder 28 and always by regulating the position of the retractable pin so that the latter penetrates the desired depth in the thickness of the plates 20 and 21, and then said welding device is entrained toward the front beveled edge 27 so as to continue the formation of the welded joint. Having reached the front beveled edge 27, the welded joint is terminated according to one of the described processes to prevent the formation of a weld hole.

In a particular embodiment of the invention, the movements of the welding device during traverses of paths whose direction is opposite the direction of production of the welded joint are not carried out following the paths superposed on the welded joint but following different paths, for example parallel or of any orientation. For example, the final retraction of the pin 29 on an exposed zone 23 of the lower plate 20 is carried out following a path of the welding device that is essentially parallel to the edge of the plate 20 in particular if the distance between the edge of the upper plate 21 and the edge of the lower plate 20 is not adequate to carry out the retraction operation in a satisfactory way by maintaining movement in the extension of the welded joint.

A particular embodiment of the process of the invention will now be given in more detail, taking into account the example that is shown in FIG. 5.

The lower plate 20 is an aircraft skin, whereby the upper plate 21 is a backing bar and each of the plates has a thickness of about 1.6 mm. Of course, it is possible to use lower plate 20 and upper plate 21 with different thicknesses.

The aluminum alloy of the two welded elements can have the same nature or a different nature. For example, in the case of a homogeneous welding, it is possible to use sheet metal laminated with 2024 T3 or 2139 T3 or T8. In the case of a heterogeneous welding, it is possible to use a skin made of laminated sheet metal 2139 T8 as a lower plate 20 and an extrudate backing bar PA765 T79 (7000 series) as an upper plate 21. In the case of heterogeneous welding, the elements are preferably welded in a final thermal state in which they will be used.

The two plates 20, 21 can have the same length, or the backing bar 21 can be shorter than the skin 20.

Lengths of 200 to 1000 mm have been welded.

The control method used is force control of the shoulder (at 8.25 kN) and position control of the pin relative to the position of the shoulder.

The procedure is then performed according to the following steps, during which the welding device 25 is kept perpendicular to the surface of the plates 20, 21 to be welded:

The welding is begun at 15 mm from the rear edge 26 of the backing bar base 21 (relative to the shaft of the pin 29), whereby the pin 29 is brought out by 2 mm relative to the surface of the shoulder.

The welding device 25 is advanced (A) by 10 mm toward the rear, i.e., in the direction of the rear edge 26 of the backing bar base 21, such that the leading edge of the shoulder 28 with a 10 mm diameter is tangent to the rear edge 26 of the backing bar base 21.

The direction of advance (B) of the welding device is then opposite the direction of the front edge 27 of the backing bar base 21, and the welding (C) is continued over the entire length of the backing bar 21 until the leading edge of the shoulder 28 of the welding device 25 is tangent to the front edge 27 of the backing bar base 21.

The direction of advance of the welding device 25 is then reversed again (D) while the pin 29 is gradually retracted into the base of the backing bar 21 over a length of 10 mm. At the end of this travel of 10 mm, during which the pin 29 is gradually retracted, said pin 29 is entirely retracted and is flush with, for example, the shoulder 28 of the welding device 25.

The invention claimed is:

1. Process for the friction-stir production of a welded joint of two plates (20, 21), respectively upper plate (21) and lower plate (20), whereby said welded joint is produced between a first beginning end and a second separate final end of the first end, using a welding device (25) having a retractable pin (29), said process comprising the following steps:

positioning and keeping the two plates (20, 21) in contact along a cover zone (24) in the desired relative position after welding, bringing the welding device into contact with one or more plates in a zone close to a front edge of the cover zone for forming the beginning of the welded joint, longitudinally welding the two plates by moving the welding device to a rear edge of the cover zone for forming the final end of the welded joint, whereby the welded joint extends from a rear edge up to a front edge of the cover zone, continuing the movement of the welding device (25) along a path that extends beyond the final end of the welded joint, and retracting the retractable pin (29) in a portion of the path of the welding device (25) that extends beyond the final end of the welded joint, so as to have a constant welded joint quality over the entire length of the welded joint and to prevent the appearance of a weld hole.

2. Process for the production of a welded joint according to claim 1, in which the path that extends beyond the final end of the welded joint is oriented in a direction that is essentially different from the direction of the welded joint.

3. Process for the production of a welded joint according to claim 1, in which the portion of the path that is followed by the welding device that extends beyond the final end of the welded joint is located in the cover zone of the two plates.

4. Process for the production of a welded joint according to claim 1, in which the retractable pin is taken outward toward the outside over at least a part of the portion of the path that is taken by the welding device from the final end of the welded joint before being retracted.

5. Process for the production of a welded joint according to claim 1, in which the path of the welding device between the beginning end of the welded joint and the final end of the welded joint is preceded by a portion of the path that originates at a point of contact of said welding device with one or more of the two plates to be welded and ends at the beginning end of the welded joint.

6. Process for the production of a welded joint according to claim 5, in which the portion of the path that extends between the point of contact and the beginning end of the welded joint is oriented in a direction that is essentially different from the direction of the welded joint.

7. A process for friction-stir production of a welded joint of an upper plate and a lower plate, whereby the welded joint is produced between a first beginning end and a second separate final end of the first end using a welding device having a retractable pin, said process comprising the steps of:
- positioning and keeping the two plates in contact along a cover zone in a desired relative position after welding;
- bringing the welding device into contact with one or more of the plates in a zone close to a front edge of the cover zone for forming the first beginning end of the welded joint;
- longitudinally welding the plates by moving the welding device to a rear edge of the cover zone for forming the second final end of the welded joint, whereby the welded joint extends from a rear edge up to a front edge of the cover zone;
- continuing the movement of the welding device along a path that extends beyond the second final end of the welded joint;
- retracting the retractable pin in a portion of the path of the welding device that extends beyond the second final end of the welded joint, so as to have a constant welded joint quality over the entire length of the welded joint and to prevent the appearance of a weld hole,
- wherein the path of the welding device between the first beginning end of the welded joint and the second final end of the welded joint is preceded by a portion of the path that originates at a point of contact of said welding device with one or more plates and ends at the first beginning end, and
- wherein the portion of the path is located in the cover zone of the two plates.

8. Process for the production of a welded joint according to claim 1, in which the shaft of the welding device is oriented to be kept approximately perpendicular to the surface for contact with the assembly of the plates at all points of the path of said welding device.

9. Process for the production of a welded joint according to claim 1, in which the front edge of the upper plate is gradually thinned in a bevel.

10. Process according to claim 9, in which the retractable pin is retracted based on the position of the welding device on the thinned front edge to maintain a desired penetration depth in the lower plate so as to maintain an essentially constant stirring depth in the thickness of the lower plate between the beginning end and the final end of the welded joint.

11. Process according to one claim 9, in which the shaft of the welding device is oriented to be kept approximately perpendicular to the surface for contact with the assembly of plates at all points of the path of said welding device.

12. Process according to claim 9, in which the portion of the path that is followed by the welding device and that extends beyond the final end of the welded joint is located on a front exposed zone of the plate.

13. Process according to claim 9, in which the rear edge of the upper plate is gradually thinned in a bevel.

14. Process according to claim 9, in which the length of a gradually thinned edge is between 5 and 15 times the thickness of the upper plate.

15. Process according to claim 1, in which the lower plate is a plate of large dimensions whose width is of the same order of magnitude as the length and in which the upper plate is an elongated plate whose ratio between the length and the width is at least equal to 10.

16. Process for the production of a welded joint according to claim 7, in which the path that extends beyond the final end of the welded joint is oriented in a direction that is essentially different from the direction of the welded joint.

17. Process for the production of a welded joint according to claim 7, in which the retractable pin is taken outward toward the outside over at least a part of the portion of the path that is taken by the welding device from the final end of the welded joint before being retracted.

18. Process for the production of a welded joint according to claim 7, in which the shaft of the welding device is oriented to be kept approximately perpendicular to the surface for contact with the assembly of the plates at all points of the path of said welding device.

19. Process for the production of a welded joint according to claim 1, in which the front edge of the upper plate is gradually thinned in a bevel.

* * * * *